(12) United States Patent
Butler (10) Patent No.: US 6,771,620 B2
(45) Date of Patent: *Aug. 3, 2004

(54) TRANSMIT GATING IN A WIRELESS COMMUNICATION SYSTEM

(75) Inventor: Brian K. Butler, La Jolla, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/336,886

(22) Filed: Jan. 6, 2003

(65) Prior Publication Data

US 2003/0100298 A1 May 29, 2003

Related U.S. Application Data

(63) Continuation of application No. 09/251,981, filed on Feb. 17, 1999, now Pat. No. 6,545,989.
(60) Provisional application No. 60/075,211, filed on Feb. 19, 1998, and provisional application No. 60/092,537, filed on Jul. 13, 1998.

(51) Int. Cl.[7] .............................................. H04Q 7/00
(52) U.S. Cl. .................... 370/329; 370/311; 455/450
(58) Field of Search ..................... 370/277, 310–311, 370/328, 329, 330–350, 464, 468, 470, 473, 474, 476; 455/422, 450.2, 455, 464, 59, 61

(56) References Cited

U.S. PATENT DOCUMENTS

| | | | |
|---|---|---|---|
| 4,901,307 A | 2/1990 | Gilhousen et al. ............. 370/18 |
| 5,056,109 A | 10/1991 | Gilhousen et al. ............. 375/1 |
| 5,101,501 A | 3/1992 | Gilhousen et al. ............. 455/33 |
| 5,103,459 A | 4/1992 | Gilhousen et al. ............. 375/1 |
| 5,109,390 A | 4/1992 | Gilhousen et al. ............. 375/1 |
| 5,414,796 A | 5/1995 | Jacobs et al. ................. 395/2.3 |
| 5,491,718 A | 2/1996 | Gould et al. ................. 375/205 |
| 5,504,773 A | 4/1996 | Padovani et al. ............ 375/200 |
| 5,506,865 A | 4/1996 | Weaver, Jr. .................. 375/205 |
| 5,659,569 A | 8/1997 | Padovani et al. ............ 370/479 |
| 5,742,592 A | * 4/1998 | Scholefield et al. ......... 370/329 |
| 5,818,829 A | * 10/1998 | Raith et al. .................. 370/347 |
| 5,831,978 A | * 11/1998 | Willars et al. ............... 370/335 |
| 5,835,889 A | * 11/1998 | Kapanen ...................... 704/215 |
| 5,896,368 A | 4/1999 | Dahlman et al. ............ 370/335 |
| 5,933,781 A | 8/1999 | Willenegger et al. ........ 370/342 |
| 5,970,058 A | * 10/1999 | DeClerk et al. ............. 370/331 |
| 5,991,284 A | 11/1999 | Willenegger et al. ........ 370/335 |
| 6,031,831 A | * 2/2000 | Tan Boon et al. ........... 370/342 |
| 6,236,656 B1 | * 5/2001 | Westerberg et al. ...... 370/395.4 |

(List continued on next page.)

FOREIGN PATENT DOCUMENTS

| | | |
|---|---|---|
| FR | 2736228 | 6/1996 |
| WO | 9429981 | 12/1994 |
| WO | 9740592 | 10/1997 |
| WO | 9740593 | 10/1997 |
| WO | 9749201 | 12/1997 |

Primary Examiner—David Vincent
(74) Attorney, Agent, or Firm—Russell B Miller; Pavel Kalousek (57) ABSTRACT

A method and system for communicating a frame of information according to both a continuous transmit format and a discontinuous transmit format. The present invention contemplates transmitting one or more data rates in either a continuous transmit mode (814) or a discontinuous transmit mode (812). The present invention contemplates continuous transmission only for certain data rates, and selection between continuous and discontinuous transmission for other data rates (810). Frames transmitted in the discontinuous transmit mode may be transmitted at a higher transmit power than in the continuous transmit mode (820). In one embodiment, the information is transmitted at a fifty-percent duty cycle during the second half of the frame when in the discontinuous transmit mode (808). During periods of non-transmission, an alternative system may be searched for as a possible candidate for hard handoff (816).

39 Claims, 8 Drawing Sheets

U.S. PATENT DOCUMENTS

| | | |
|---|---|---|
| 6,240,071 B1 | 5/2001 | Willenegger et al. ........ 370/311 |
| 6,285,665 B1 * | 9/2001 | Chuah ......................... 370/319 |
| 6,298,084 B1 * | 10/2001 | Vinggaard et al. ........... 375/224 |
| 6,317,435 B1 * | 11/2001 | Tiedemann et al. .......... 370/441 |
| 6,318,230 B1 | 11/2001 | Bamber ........................... 42/77 |
| 6,396,804 B2 | 5/2002 | Odenwalder ................. 370/209 |
| 6,404,826 B1 * | 6/2002 | Schmidl et al. .............. 375/340 |
| 6,424,619 B2 | 7/2002 | Odenwalder et al. ........ 370/209 |
| 6,545,989 B1 * | 4/2003 | Buttler ......................... 370/329 |
| 6,574,211 B2 * | 6/2003 | Padovani et al. ............ 370/347 |
| 6,594,286 B2 * | 7/2003 | Chen et al. ................... 370/529 |

* cited by examiner

TRANSMIT GATING IN A WIRELESS COMMUNICATION SYSTEM

CROSS-REFERENCE

This application is a continuation of U.S. application Ser. No. 09/251,981, now U.S. Pat. No. 6,545,989, filed Feb. 17, 1999, entitled "Transmit Gating in a Wireless Communication System" which claims the benefit of U.S. provisional application No. 60/075,211, filed on Feb. 19, 1998 both are assigned to the assignee of the present invention. The disclosure of this provisional application is incorporated herein by reference.

BACKGROUND OF THE INVENTION

I. Field of the Invention

The present invention relates to communications. More particularly, the present invention relates to a novel and improved method and apparatus for transmitting variable rate data in a wireless communication system, and for assisting a hard handoff.

II. Description of the Related Art

The use of code division multiple access (CDMA) modulation techniques is one of several techniques for facilitating communications in which a large number of system users are present. Other multiple access communication system techniques, such as time division multiple access (TDMA) and frequency division multiple access (FDMA) are known in the art. However, the spread spectrum modulation techniques of CDMA have significant advantages over these modulation techniques for multiple access communication systems. The use of CDMA techniques in a multiple access communication system is disclosed in U.S. Pat. No. 4,901,307, entitled "SPREAD SPECTRUM MULTIPLE ACCESS COMMUNICATION SYSTEM USING SATELLITE OR TERRESTRIAL REPEATERS", assigned to the assignee of the present invention, and incorporated by reference herein. The use of CDMA techniques in a multiple access communication system is further disclosed in U.S. Pat. No. 5,103,459, entitled "SYSTEM AND METHOD FOR GENERATING SIGNAL WAVEFORMS IN A CDMA CELLULAR TELEPHONE SYSTEM", assigned to the assignee of the present invention and incorporated by reference herein.

CDMA by its inherent nature of being a wideband signal offers a form of frequency diversity by spreading the signal energy over a wide bandwidth. Therefore, frequency selective fading affects only a small part of the CDMA signal bandwidth. Space or path diversity is obtained by providing multiple signal paths through simultaneous links from a mobile user through two or more cell-sites. Furthermore, path diversity may be obtained by exploiting the multipath environment through spread spectrum processing by allowing a signal arriving with different propagation delays to be received and processed separately. Examples of path diversity are illustrated in U.S. Pat. No. 5,101,501 entitled "METHOD AND SYSTEM FOR PROVIDING A SOFT HANDOFF IN COMMUNICATIONS IN A CDMA CELLULAR TELEPHONE SYSTEM", and U.S. Pat. No. 5,109,390 entitled "DIVERSITY RECEIVER IN A CDMA CELLULAR TELEPHONE SYSTEM", both assigned to the assignee of the present invention and incorporated by reference herein.

A method for transmission of speech in digital communication systems that offers particular advantages in increasing capacity while maintaining high quality of perceived speech is by the use of variable rate speech encoding. The method and apparatus of a particularly useful variable rate speech encoder is described in detail in U.S. Pat. No. 5,414,796, entitled "VARIABLE RATE VOCODER", assigned to the assignee of the present invention and incorporated by reference herein.

The use of a variable rate speech encoder provides for data frames of maximum speech data capacity when the speech encoder is providing speech data at a maximum rate. When the variable rate speech encoder is providing speech data at a less that maximum rate, there is excess capacity in the transmission frames. A method for transmitting additional data in transmission frames of a fixed predetermined size, wherein the source of the data for the data frames is providing the data at a variable rate, is described in detail in U.S. Pat. No. 5,504,773, entitled "METHOD AND APPARATUS FOR THE FORMATTING OF DATA FOR TRANSMISSION", assigned to the assignee of the present invention and incorporated by reference herein. In the above mentioned patent application, a method and apparatus is disclosed for combining data of differing types from different sources in a data frame for transmission.

In frames containing less data than a predetermined capacity, power consumption may be lessened by transmission gating a transmission amplifier such that only parts of the frame containing data are transmitted. Furthermore, message collisions in a communication system may be reduced if the data is placed into frames in accordance with a predetermined pseudorandom process. A method and apparatus for gating the transmission and for positioning the data in the frames is disclosed in U.S. Pat. No. 5,659,569, entitled "DATA BURST RANDOMIZER", assigned to the assignee of the present invention and incorporated by reference herein.

A useful method of power control of a mobile in a communication system is to monitor the power of the received signal from the wireless communication device at a base station. In response to the monitored power level, the base station transmits power control bits to the wireless communication device at regular intervals. A method and apparatus for controlling transmission power in this fashion is disclosed in U.S. Pat. No. 5,056,109, entitled "METHOD AND APPARATUS FOR CONTROLLING TRANSMISSION POWER IN A CDMA CELLULAR MOBILE TELEPHONE SYSTEM", assigned to the assignee of the present invention and incorporated by reference herein.

In a communication system that provides data using a QPSK modulation format, very useful information can be obtained by taking the cross product of the I and Q components of the QPSK signal. By knowing the relative phases of the two components, one can determine roughly the velocity of the wireless communication device in relation to the base station. A description of a circuit for determining the cross product of the I and Q components in a QPSK modulation communication system is disclosed in U.S. Pat. No. 5,506,865, entitled "PILOT CARRIER DOT PRODUCT CIRCUIT", assigned to the assignee of the present invention and incorporated by reference herein.

There has been an increasing demand for wireless communications systems to be able to transmit digital information at high rates. One method for sending high rate digital data from a wireless communication device to a central base station is to allow the wireless communication device to send the data using spread spectrum techniques of CDMA. One method that is proposed is to allow the wireless communication device to transmit its information using a small set of orthogonal channels. Such a method is described in detail in co-pending U.S. Pat. No. 6,396,804, entitled "HIGH DATA RATE CDMA WIRELESS COMMUNICATION SYSTEM", assigned to the assignee of the present invention and incorporated by reference herein.

In the just-mentioned application, a system is disclosed in which a pilot signal is transmitted on the reverse link (the link from the wireless communication device to the base station) to enable coherent demodulation of the reverse link signal at the base station. Using the pilot signal data, coherent processing can be performed at the base station by determining and removing the phase offset of the reverse link signal. Also, the pilot data can be used to optimally weigh multipath signals received with different time delays before being combined in a rake receiver. Once the phase offset is removed, and the multipath signals properly weighted, the multipath signals can be combined to decrease the power at which the reverse link signal must be received for proper processing. This decrease in the required receive power allows greater transmission rates to be processed successfully, or conversely, the interference between a set of reverse link signals to be decreased.

While some additional transmit power is necessary for the transmission of the pilot signal, in the context of higher transmission rates the ratio of pilot signal power to the total reverse link signal power is substantially lower than that associated with lower data rate digital voice data transmission cellular systems. Thus, within a high data rate CDMA system, the $E_b/N_0$ gains achieved by the use of a coherent reverse link outweigh the additional power necessary to transmit pilot data from each wireless communication device.

An additional benefit of the reverse link described in this co-pending application is that it generates less amplitude modulation (AM) interference due to its continuous-transmit nature. Thus, users with sensitive electronic equipment such as hearing aids and pacemakers will experience less interference than with a discontinuous transmit reverse link. Another example of the use of continuous transmission to reduce AM interference is given in co-pending U.S. Pat. No. 6,205,190, filed Apr. 29, 1996, entitled "SYSTEM AND METHOD FOR REDUCING INTERFERENCE GENERATED BY A CDMA COMMUNICATIONS DEVICE", assigned to the assignee of the present invention and incorporated herein by reference.

However, when the data rate is relatively low, a continuously-transmitted pilot signal on the reverse link contains more energy relative to the data signal. At these low rates, the benefits of coherent demodulation and reduced interference provided by a continuously-transmitted reverse link pilot signal may be outweighed by the decrease in talk time and system capacity in some applications. A method and system is needed to provide flexibility in reverse link transmission format as needed to optimize these tradeoffs.

Further, a communications device may need to go into hard handoff from a first system to a second system. If discontinuous transmission is possible, the device may search for the second system during the periods of non-transmission, while maintaining contact with the first system during periods of transmission.

SUMMARY OF THE INVENTION

The present invention is a novel and improved method and system for communicating a frame of information according to both a continuous transmit format and a discontinuous transmit format. In one aspect of the present invention, a method is disclosed for transmitting frames of information. The method includes transmitting information continuously throughout the frame when in a continuous transmit mode and the frame is of a first data rate of a plurality of data rates; and transmitting the information discontinuously in the frame when in a discontinuous transmit mode and the frame is of the first data rate. Thus, the present invention contemplates transmitting one or more data rates in either a continuous transmit mode or a discontinuous transmit mode.

The method may further include transmitting the information continuously throughout the frame when the frame is of a second data rate of the plurality of data rates. Thus, the present invention contemplates continuous transmission only for certain data rates, and selection between continuous and discontinuous transmission for other data rates.

In one embodiment of the present invention, the first data rate corresponds to a first transmit power and the second data rate corresponds to a second transmit power, and the first transmit power is less than the second transmit power. In this embodiment, the method includes transmitting the frame of the first data rate at the second transmit power when in the discontinuous transmit mode. Thus, frames transmitted in the discontinuous transmit mode may be transmitted at a higher transmit power than in the continuous transmit mode.

In one embodiment of the present invention, the information is transmitted at a fifty-percent duty cycle during the frame when in the discontinuous transmit mode. This may include transmitting the information during a second half of the frame.

Another embodiment of the present invention includes selecting between the continuous transmit mode and the discontinuous transmit mode in response to a transmit power of the wireless communication device. In other words, the present invention may include selecting the discontinuous transmit mode when the transmit power is less than a predetermined threshold. In an alternate embodiment, the present invention includes selecting between the continuous transmit mode and the discontinuous transmit mode according to a user-defined preference.

The present invention also contemplates a wireless communication device for transmitting frames of information. The wireless communication device includes a variable rate data source for generating the frames of information, each of the frames of information having one of a plurality of data rates. It also includes a transmitter for transmitting the information continuously throughout the frame when in a continuous transmit mode and when the frame is of a first data rate of the plurality of data rates, and for transmitting the information discontinuously in the frame when in a discontinuous transmit mode and when the frame is of the first data rate. Thus, the wireless communication device may transmit frames of a given data rate either continuously or discontinuously. A control processor selects between the continuous transmit mode and the discontinuous transmit mode. The wireless communication device may implement the method of the present invention as summarized briefly above.

The present invention also includes a method for receiving a frame of information in a wireless receiver, wherein the information may be continuously present throughout the frame or discontinuously present in the frame. This method includes filtering the frame of information in a sliding window filter to produce a sliding window phase estimate signal, filtering the frame of information in a block window filter to produce a block window phase estimate signal, and selecting between the sliding window phase estimate signal and the block window phase estimate signal in response to whether the information is continuously present in the frame.

In one embodiment of the present invention, the method includes selecting the sliding window phase estimate signal when the information is continuously present in the frame, and selecting the block window phase estimate signal when the information is discontinuously present in the frame. Additionally, the method may include selecting the block window phase estimate signal before and after a phase discontinuity in the frame.

The present invention further contemplates a wireless receiver for receiving a frame of information wherein the information may be continuously present throughout the frame or discontinuously present in the frame. The wireless receiver includes a sliding window phase estimator for filtering the frame of information in a sliding window to produce a sliding window phase estimate signal, a block window phase estimator for filtering the frame of information in a block window to produce a block window phase estimate signal, and a multiplexer for selecting between the sliding window phase estimate signal and the block window phase estimate signal in response to whether the information is continuously present in the frame. The wireless receiver may implement the method briefly described above.

Additionally, the present invention discloses a method, in a wireless communication system, for communicating a frame of information between a wireless communication device and a wireless base station in a continuous transmit mode and a discontinuous transmit mode. The method includes transmitting, from the wireless communication device, the information continuously throughout the frame when in the continuous transmit mode, and transmitting, from the wireless communication device, a first message notifying the wireless base station of an intention to transmit in a discontinuous mode. In response, the base station transmits a second message acknowledging the intention to transmit in the discontinuous mode, and the wireless communication device transmits the information discontinuously in the frame when in the discontinuous transmit mode, and in response to the second message.

In one embodiment, the method further includes demodulating the frame of information according to a continuous transmit format when the information is continuously present throughout the frame, and demodulating, the frame of information according to a discontinuous transmit format when the information is discontinuously present in the frame.

The present invention further contemplates a wireless communication system for communicating a frame of information in a continuous transmit mode and a discontinuous transmit mode. The wireless communication system includes a wireless communication device and a wireless base station that implement the method described briefly above.

In a final aspect of the present invention, a method and apparatus are disclosed for facilitating hard handoff from a first system to a second system. The device searches for the second system during the periods of non-transmission, while maintaining contact with the first system during periods of transmission.

Gating is supported for rate sets 3, 4, 5 and 6. When a frame is gated, only the symbols within the second half of the frame are sent. This means that symbols 6144 through 12287, numbering from 0, are transmitted. During gating, the maximum frame rate is rate ½.

Normally, the blocks are transmitted using continuous transmission, with the exception of the rate ⅛ frame which is gated. The continuous transmission reduces the interference in the audio band. The rate ⅛ frame is gated because it improves the reverse link capacity and the mobile station talk time relative to when continuous transmission is used.

However, rate set 3, 4, 5 and 6 may be commanded into a mode where only rate ⅛, rate ¼, and rate ½ frames are transmitted and are transmitted using gated transmission. This mode is used to allow the mobile station time to retune its receiver and search for systems using frequencies and other technologies (e.g. AMPS and GSM).

During gating, the second half of the frame is transmitted for the following reasons. First, the gating needs to be either in the first half or the second half of the frame. If it were not, then the frame would not contain a contiguous 10 milliseconds for searching. Second, the transmitted portion of the frame needs to occur later in the frame in order to allow the mobile station time to estimate the difference between the measured and expected forward signal to noise ratio. Therefore, during gating, the second half of the frame is sent.

In addition, rate set 3, 4, 5 and 6 may be commanded into a mode where all frames are transmitted using continuous transmission. This mode is used by mobile stations that may need to further reduce audio band interference.

A mobile station commanded into gated mode for searching will be commanded to periodically gate N frames out of M frames on the forward link and reverse link simultaneously, starting at system time T. The values of N and M depend on the technology being searched and the number of channels being searched.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

Figure 1:
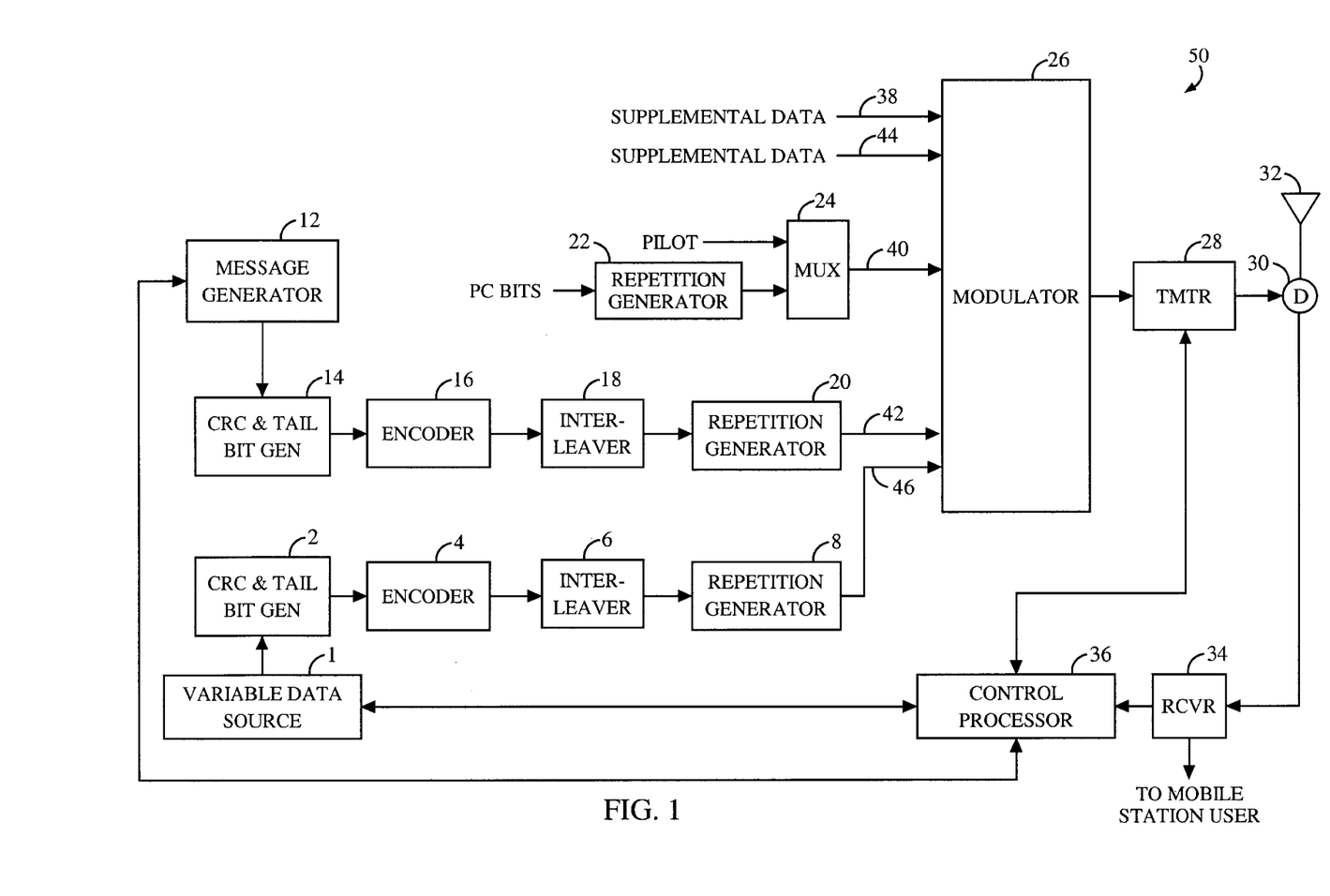
FIG. 1 is a functional block diagram of an exemplary embodiment of the transmission system of the present invention embodied in wireless communication device 50.

FIG. 1 illustrates a functional block diagram of an exemplary embodiment of the transmission system of the present invention embodied in wireless communication device 50. It will be understood by one skilled in the art that the methods described herein could be applied to transmission from a central base station (not shown) as well. It will also be understood that various of the functional blocks shown in FIG. 1 may not be present in other embodiments of the present invention. The functional block diagram of FIG. 1 corresponds to an embodiment that is useful for operation according to the TIA/EIA Standard IS-95C, also referred to commercially as cdma2000. Other embodiments of the present invention are useful for other standards including Wideband CDMA standards and dual-mode CDMA/GSM standards. These other embodiments differ somewhat in the formatting of data for transmission, but still include the inventive principles described herein.

In the exemplary embodiment of FIG. 1, the wireless communication device transmits a plurality of distinct channels of information which are distinguished from one another by short orthogonal spreading sequences as described in the aforementioned U.S. Pat. No. 6,396,804. Five separate code channels are transmitted by the wireless communication device: 1) a first supplemental data channel 38, 2) a time multiplexed channel of pilot and power control symbols 40, 3) a dedicated control channel 42, 4) a second supplemental data channel 44 and 5) a fundamental channel 46. The first supplemental data channel 38 and second supplemental data channel 44 carry digital data which exceeds the capacity of the fundamental channel 46 such as facsimile, multimedia applications, video, electronic mail messages or other forms of digital data. The multiplexed channel of pilot and power control symbols 40 carries pilots symbols to allow for coherent demodulation of the data channels by the central base station and power control bits to control the energy of transmissions to wireless communication device 50. Control channel 42 carries control information to the central base station such as modes of operation of wireless communication device 50, capabilities of wireless communication device 50 and other necessary signaling information. Fundamental channel 46 is the primary channel used to carry the primary information signal from the wireless communication device to the central base station. In the case of speech transmissions, the fundamental channel 46 carries the speech data.

Supplemental data channels 38 and 44 are encoded and processed for transmission by means not shown and provided to modulator 26. Power control bits are provided to repetition generator 22 which provides repetition of the power control bits before providing the bits to multiplexer (MUX) 24. In multiplexer 24 the redundant power control bits are time multiplexed with pilot symbols and provided on line 40 to modulator 26.

Message generator 12 generates necessary control information messages and provides the control message to CRC and tail bit generator 14. CRC and tail bit generator 14 appends a set of cyclic redundancy check bits which are parity bits used to check the accuracy of the decoding at the central base station and appends a predetermined set of tail bits to the control message. The message is then provided to encoder 16 which provide forward error correction coding upon the control message. The encoded symbols are provided to interleaver 18 which reorders the symbols in accordance with a predetermined interleaver format. The interleaved symbols are provided to repetition generator 20 which repeats the reordered symbols to provide additional time diversity in the transmission. The interleaved symbols are provided on line 42 to modulator 26.

Variable rate data source 1 generates variable rate data. In the exemplary embodiment, variable rate data source 1 is a variable rate speech encoder such as described in aforementioned U.S. Pat. No. 5,414,796. Variable rate speech encoders are popular in wireless communications because their use increases the battery life of wireless communication devices and increases system capacity. The Telecommunications Industry Association has codified the most popular variable rate speech encoders in such standards as Interim Standard IS-96 and Interim Standard IS-733. These variable rate speech encoders encode the speech signal at four possible rates referred to as full rate, half rate, quarter rate or eighth rate according to the level of voice activity. The rate indicates the number of bits used to encode a frame of speech and varies on a frame by frame basis. Full rate uses a predetermined maximum number of bits to encode the frame, half rate uses half the predetermined maximum number of bits to encode the frame, quarter rate uses one quarter the predetermined maximum number of bits to encode the frame and eighth rate uses one eighth the predetermined maximum number of bits to encode the frame.

Variable rate date source 1 provides the encoded speech frame to CRC and tail bit generator 2. CRC and tail bit generator 2 appends a set of cyclic redundancy check bits which are parity bits used to check the accuracy of the decoding at the central base station and appends a predetermined set of tail bits to the control message. The frame is then provided to encoder 4 which provide forward error correction coding on the speech frame. The encoded symbols are provided to interleaver 6 which reorders the symbols in accordance with a predetermined interleaver format. The interleaved symbols are provided to repetition generator 8 which provided repetition of the reordered symbols to provide additional time diversity in the transmission. The interleaved symbols are provided on line 46 to modulator 26.

In the exemplary embodiment, modulator 26 modulates the data channels in accordance with a code division multiple access modulation format and provides the modulated information to transmitter (TMTR) 28 which amplifies and filters the signal and provides the signal through duplexer 30 for transmission through antenna 32.

Figure 2:
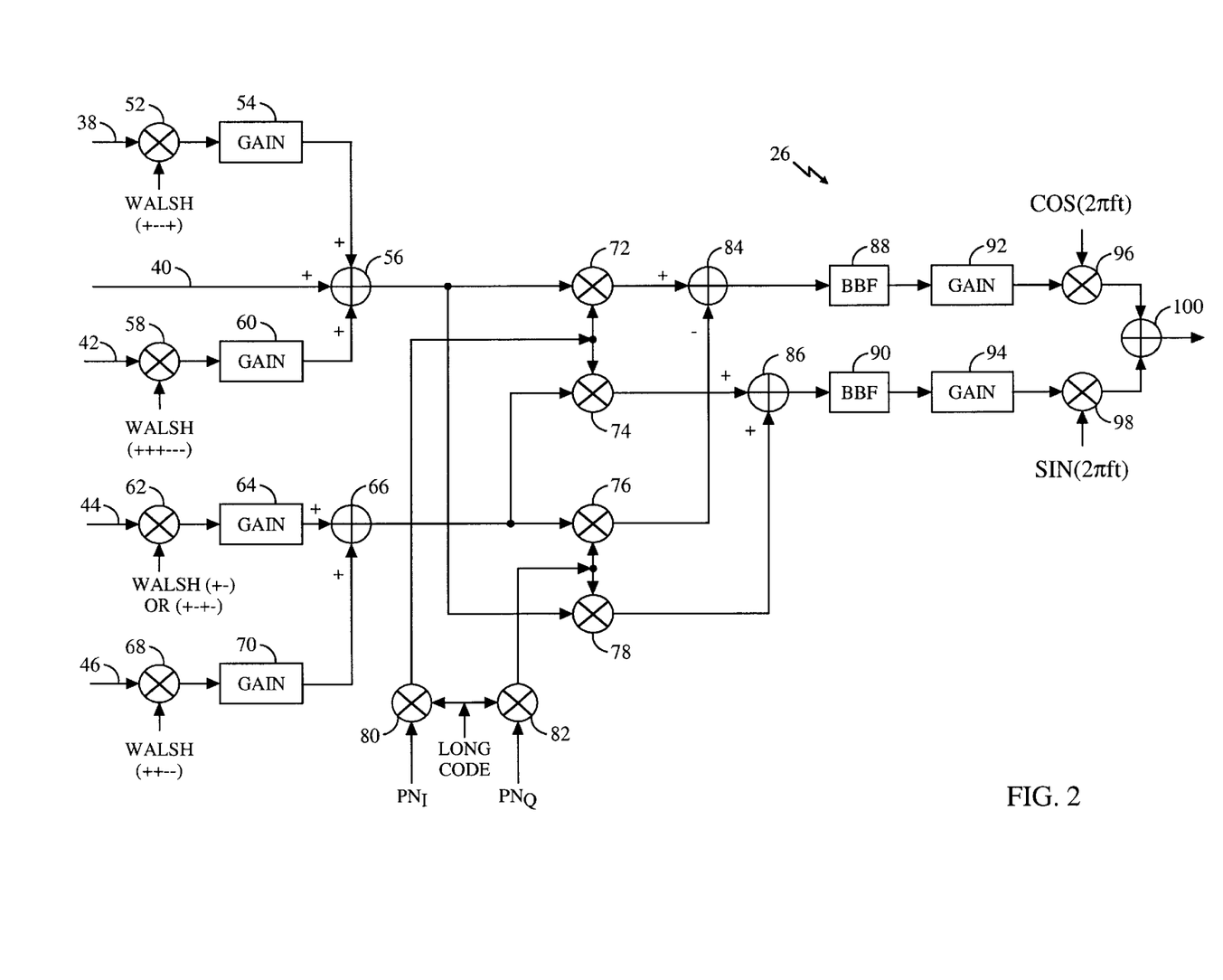
FIG. 2 is a functional block diagram of an exemplary embodiment of modulator 26 of FIG. 1.

FIG. 2 illustrates a functional block diagram of an exemplary embodiment of modulator 26 of FIG. 1. The first supplemental data channel data is provided on line 38 to spreading element 52 which covers the supplemental channel data in accordance with a predetermined spreading sequence. In the exemplary embodiment, spreading element 52 spreads the supplemental channel data with a short Walsh sequence (+--+). The spread data is provided to relative gain element 54 which adjusts the gain of the spread supplemental channel data relative to the energy of the pilot and power control symbols. The gain adjusted supplemental channel data is provided to a first summing input of summer 56. The pilot and power control multiplexed symbols are provided on line 40 to a second summing input of summing element 56.

Control channel data is provided on line 42 to spreading element 58 which covers the supplemental channel data in accordance with a predetermined spreading sequence. In the exemplary embodiment, spreading element 58 spreads the supplemental channel data with a short Walsh sequence (++++----). The spread data is provided to relative gain element 60 which adjusts the gain of the spread control channel data relative to the energy of the pilot and power control symbols. The gain adjusted control data is provided to a third summing input of summer 56.

Summing element 56 sums the gain adjusted control data symbols, the gain adjusted supplemental channel symbols and the time multiplexed pilot and power control symbols and provides the sum to a first input of multiplier 72 and a first input of multiplier 78.

The second supplemental channel is provided on line 44 to spreading element 62 which covers the supplemental channel data in accordance with a predetermined spreading sequence. In the exemplary embodiment, spreading element 62 spreads the supplemental channel data with a short Walsh sequence (+−+−). The spread data is provided to relative gain element 64 which adjusts the gain of the spread supplemental channel data. The gain adjusted supplemental channel data is provided to a first summing input of summer 66.

The fundamental channel data is provided on line 46 to spreading element 68 which covers the fundamental channel data in accordance with a predetermined spreading sequence. In the exemplary embodiment, spreading element 68 spreads the supplemental channel data with a short Walsh sequence (++−−). The spread data is provided to relative gain element 70 which adjusts the gain of the spread fundamental channel data. The gain adjusted fundamental channel data is provided to a second summing input of summer 66.

Summing element 66 sums the gain adjusted second supplemental channel data symbols and the fundamental channel data symbols and provides the sum to a first input of multiplier 74 and a first input of multiplier 76.

In the exemplary embodiment, a pseudonoise spreading using two different short PN sequences ($PN_I$ and $PN_Q$) is used to spread the data. In the exemplary embodiment the short PN sequences, $PN_I$ and $PN_Q$, are multiplied by a long PN code to provide additional privacy. The generation of pseudonoise sequences is well known in the art and is described in detail in aforementioned U.S. Pat. No. 5,103,459. A long PN sequence is provided to a first input of multipliers 80 and 82. The short PN sequence $PN_I$ is provided to a second input of multiplier 80 and the short PN sequence $PN_Q$ is provided to a second input of multiplier 82.

The resulting PN sequence from multiplier 80 is provided to respective second inputs of multipliers 72 and 74. The resulting PN sequence from multiplier 82 is provided to respective second inputs of multipliers 76 and 78. The product sequence from multiplier 72 is provided to the summing input of subtractor 84. The product sequence from multiplier 74 is provided to a first summing input of summer 86. The product sequence from multiplier 76 is provided to the subtracting input of subtractor 84. The product sequence from multiplier 78 is provided to a second summing input of summer 86.

The difference sequence from subtractor 84 is provided to baseband filter 88. Baseband filter 88 performs necessary filtering on the difference sequence and provides the filtered sequence to gain element 92. Gain element 92 adjusts the gain of the signal and provides the gain to upconverter 96. Upconverter 96 upconverts the gain adjusted signal in accordance with a QPSK modulation format and provides the unconverted signal to a first input of summer 100.

The summing sequence from summer 86 is provided to baseband filter 90. Baseband filter 90 performs necessary filtering on difference sequence and provides the filtered sequence to gain element 94. Gain element 94 adjusts the gain of the signal and provides the gain to upconverter 98. Upconverter 98 upconverts the gain adjusted signal in accordance with a QPSK modulation format and provides the upconverted signal to a second input of summer 100. Summer 100 sums the two QPSK modulated signals and provides the result to transmitter 28.

Figure 3:
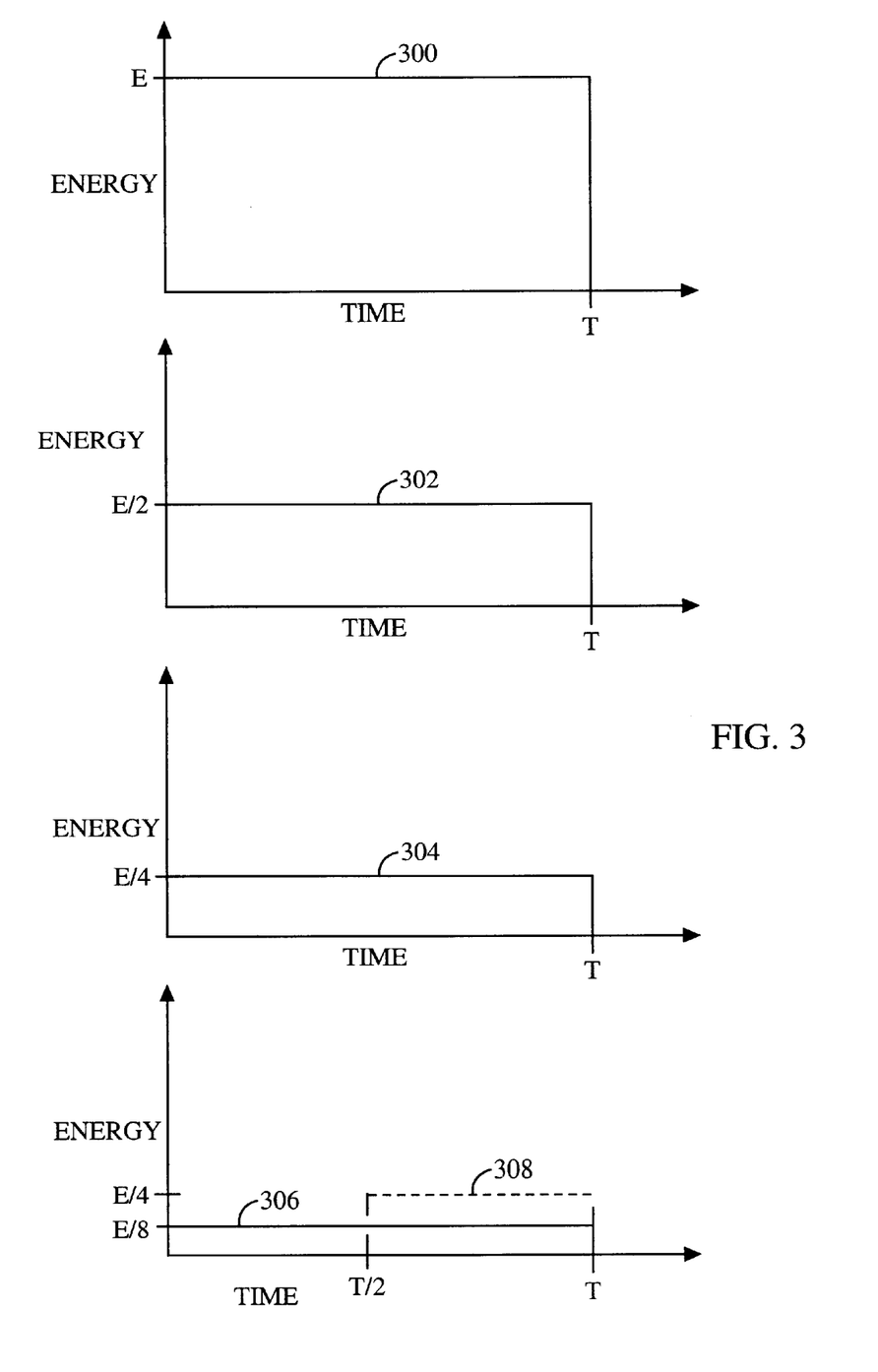
FIG. 3 illustrates four graphs of the average energy transmitted by transmitter 28 of FIG. 1 over a single frame for four different data rates.

FIG. 3 illustrates four graphs of the average energy transmitted by transmitter 28 over a single frame for full rate 300, half rate 302, quarter rate 304, and eighth rate transmissions 306 and 308, respectively. As can be seen, for the full rate transmission 300, the average energy is equal to some predetermined maximum level, E. For half rate transmission 302, the average energy is equal to half the predetermined maximum level, or E/2. Likewise for quarter-rate transmission 304, the average energy is equal to one-quarter of the predetermined maximum level, or E/4.

For the eighth-rate transmissions 306 and 308, there are two possible transmit energies. The first transmission 306 uses continuous transmission at one-eighth of the predetermined maximum level, or E/8. The second transmission 308 (shown in dashed lines), uses a 50% duty cycle transmission at one-quarter of the predetermined maximum level, or E/4. In other words, the present invention provides two separate transmission schemes for the eighth-rate frames: a continuous transmission 306 at E/8, and a discontinuous transmission 308 at E/4. It should be noted that the discontinuous transmission 308 shown in FIG. 3 is merely exemplary. Other duty cycles and energy values are also contemplated by the present invention. For example, a 25% duty cycle at and energy of E/2 may be used in one embodiment. Another embodiment uses a 50% duty cycle with the transmission occurring in the first half of the frame, rather than the second half of the frame as shown in FIG. 3. In yet another embodiment, the transmission start time is randomized during the frame. However, even in the embodiments that do not randomize the transmission, the frame offset staggering in increments of 1.25 ms that is inherent to cdma2000 will distribute the aggregate interference well over a frame duration.

The amount of energy, timing, and duty cycle chosen are not limiting of the present invention. However, in the embodiment shown in FIG. 3, the transmission occurs during the second half of the frame so that power control can be the most accurate at the end of the frame in case the following frame is at a higher data rate. And hence more critical to control accurately since the higher data rate frames are transmitted at higher power and contain more information. Also in the embodiment of FIG. 1, the interleavers 6 and 18 and repetition generators 8 and 20 format the data such that transmitting only the second half of the frame ensures that each of the original information bits are transmitted at least once.

Control processor 36 controls the selection of whether the eighth-rate transmission is continuous or discontinuous. Variable rate data source 1 generates a rate indication to control processor 36, informing the control processor 36 what the present data rate is. In response, control processor 36 determines whether to gate transmitter 28 on and off to implement the discontinuous transmission of the eighth-rate frames. In one embodiment of the present invention, control processor 36 instructs message generator 12 to generate a message for transmission to the base station over the control channel indicating that the wireless communication device 50 intends to operate in the discontinuous mode. In another embodiment, this message may be a request to operate in discontinuous mode, provided that the base station receiver can support discontinuous mode transmissions.

In one embodiment of the present invention, the control processor 36 may be programmed to always transmit eighth-rate frames according to the discontinuous mode shown as dashed line 308 of FIG. 3. In another embodiment, the control processor 36 may dynamically determine whether to transmit continuously or discontinuously according to the present transmit power of transmitter 28. Since the AM interference caused by discontinuous transmission is proportional to the amplitude of the transmitted signal, the control processor 36 may compare the present transmit power to a predetermined threshold. If the transmit power is greater than the predetermined threshold, the control processor 36 does not gate the transmitter 28, resulting in continuous transmission. If the transmit power is less than or equal to the predetermined threshold, the control processor 36 does gate the transmitter 28, resulting in discontinuous transmission. In such an embodiment, the present transmit power may be determined by any means known in the art. For example, by measuring the output power of transmitter 28 with a conventional signal level detector circuit (not shown), or by accumulating power control commands received by a receiver 34 from the base station, or by monitoring automatic gain control signals being sent to the transmitter 28. Each of these power measurement techniques is well known in the art and will not be expanded upon herein.

In another embodiment of the present invention, the control processor 36 determines whether to transmit continuously or discontinuously according to user-defined preferences. For example, a menu option may be presented to a user on a graphical display (not shown), allowing the user to enable or disable discontinuous transmission. This embodiment would be particularly useful to persons using sensitive electronic equipment such as hearing aids and pacemakers to allow them to program their wireless communication device to always perform continuous transmission. This allows the user to make their own decision about the tradeoff between battery life and potentially dangerous AM interference. Still another embodiment allows discontinuous transmission during voice calls, and disables discontinuous transmission during data calls.

Typical wireless communication device power amplifiers use significant amounts of current. Also, other transmit signal processing components consume power. An example of the current consumption for various components in the transmitter 28 is shown in TABLE I below.

TABLE I

| Function | Current (mA) |
|---|---|
| Power Amplifier Bias Current | 110–130 mA |
| Power Amplifier Driver Current | 42 mA |
| DAC, filtering, upconverter, AGC | 40 mA |
| Total | 202 mA |

As can be seen from TABLE I above, approximately 202 mA of current may be switched out during discontinuous transmission in a typical wireless communication device. A typical variable rate data source 1, during normal human speech, will produce eighth-rate frames about 63% of the time. So the potential average current savings for the example of TABLE I is about 63% eighth-rate frames*50% duty cycle*202 mA=64 mA. This is a significant amount of current savings in a typical wireless communication device where the total current consumption is approximately 320 mA at 100% duty cycle. In this example, discontinuous transmission of eighth-rate frames at a 50% duty cycle yields about a 25% increase in talk time.

In addition to the increase in talk time, a system capacity benefit is also realized by the present invention. As is known in the art, the strength of the reverse link pilot signal is driven primarily by the need to track the carrier phase and timing of the reverse link waveform. For most of the time during voice calls a typical wireless communication device is transmitting eighth-rate frames, and therefore is transmitting mostly pilot energy. By turning both the pilot and data signals off during low rate frames, the present invention enhances system capacity.

For example, if we assume that the required traffic component $E_b/N_0$ is 1.6 dB per antenna at 9600 bps, 0.1 dB per antenna at 1500 bps, and the required pilot component $E_C/N_0$ is −22.1 dB per antenna, we find the pilot power fraction shown below in TABLE II.

TABLE II

| Traffic Data Rate (bps) | Traffic $E_b/N_0$ (dB) per antenna | Average Pilot $E_c/N_0$ (dB) per antenna | Pilot Power (%) |
|---|---|---|---|
| 9600 | 1.6 | −22 | 36% |
| Continuous 1500 | 0.1 | −22 | 86% |
| 50% duty cycle 1500 | 0.1 | −25 | 76% |

Using the approximations shown above in TABLE II, gating the 1500 bps frames at the 50% duty cycle reduces the average voice call $E_C/N_0$ by 0.85 dB for 8 kbps vocoder operation.

By operating at the exemplary 50% duty cycle for eighth-rate frames, the ability to maintain power control on the reverse link and forward link is affected. The update rate is reduced by a factor of two. For example, the update rate in a cdma2000 system may be reduced from 800 times per second to 400 times per second. This tends to cause an increase in the frame error rate for the eighth-rate frames. However, the increase in capacity and talk time gained by the present invention may outweigh this decrease in power control accuracy in many applications. Additionally, in one embodiment of the present invention, the transmit period (i.e., the time that the transmitter 28 is gated "on") is arranged to occur at the end of the frame so that power control is most accurate at the frame boundary where the data rate may suddenly increase for the next frame.

Figure 4:
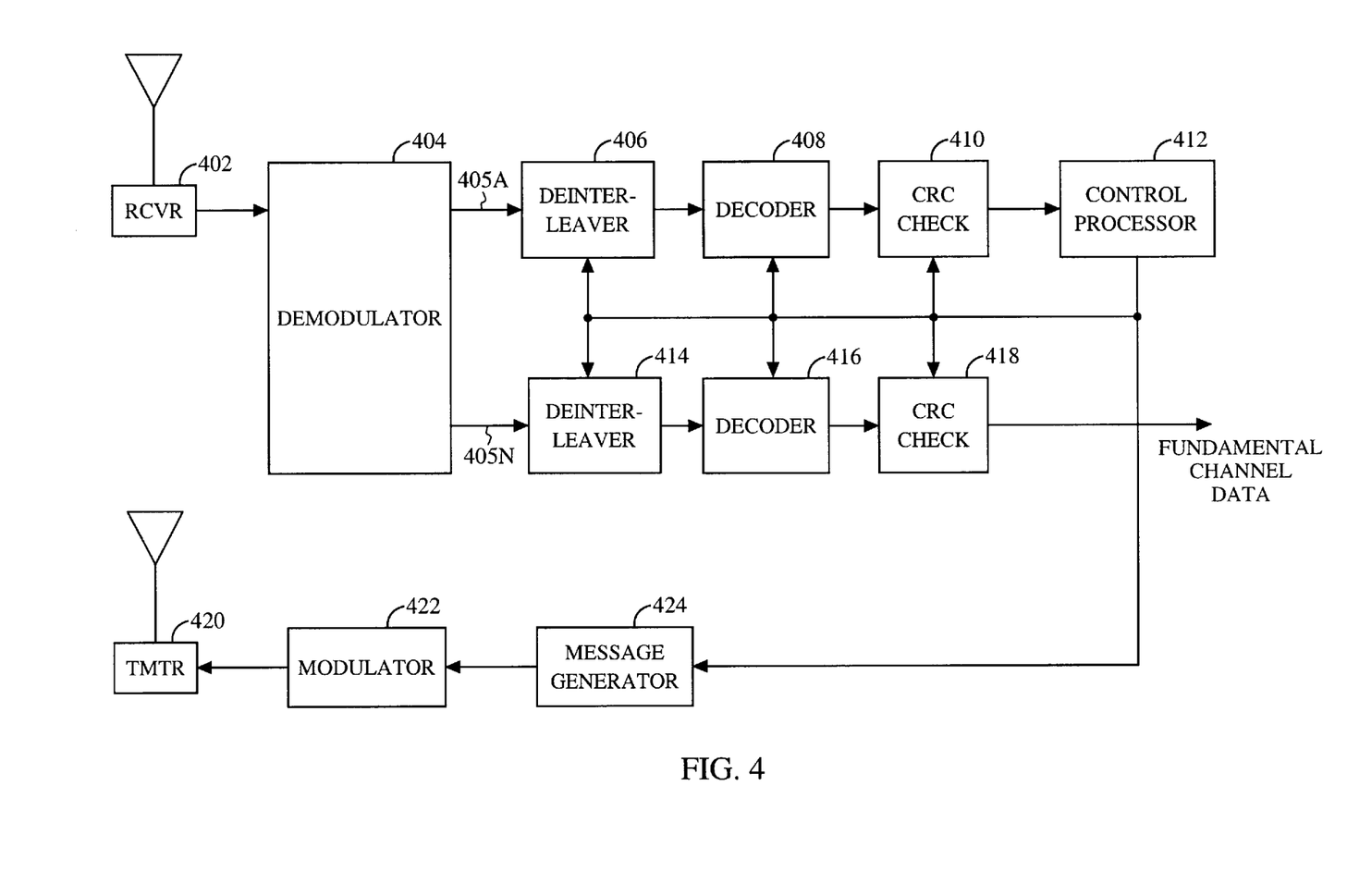
FIG. 4 is a functional block diagram of selected portions of a base station 400 in accordance with the present invention.

Turning now to FIG. 4, a functional block diagram of selected portions of a base station 400 in accordance with the present invention. Reverse link RF signals from the wireless communication device 50 (FIG. 1) are received by receiver (RCVR) 402, which downconverts the received reverse link RF signals to an baseband frequency. The baseband signal is then demodulated by demodulator 404. Demodulator 404 is further described with reference to FIG. 5 below.

In the exemplary embodiment of FIG. 4, demodulator 404 has multiple outputs 405A–405N, each corresponding to a different one of the logical channels modulated by modulator 26 of FIG. 1. For example, output 405A corresponds to the control channel 42 of FIG. 1, and output 405N corresponds to the fundamental channel 46 of FIG. 1. Demodulator 404 typically will have other demodulated signal outputs. However, for clarity and simplicity, only the control channel 405A and fundamental channel 405N are shown in FIG. 4.

The control channel 405A data is de-interleaved by deinterleaver 406, decoded by decoder 408 and CRC checked by CRC checker 410. Each of these functional blocks 406–410. performs a complementary function as their counterparts in blocks 14–18 of FIG. 1. The control channel data is then passed to control processor 412 for further processing. For example, the control channel data may include a message from the wireless communication device 50 indicating that it either intends, or is requesting, to operate in discontinuous mode. In response to this message, control processor 412 directs message generator 424 (which includes forward link data formatting) to generate a reply message to the wireless communication device 50, acknowledging reception of the intention or request message. The acknowledgment message is then modulated by modulator 422 and transmitted by transmitter (TMTR) 420.

The fundamental channel 405N is de-interleaved by deinterleaver 414, decoded by decoder 416 and CRC checked by CRC checker 418. Each of these functional blocks 414–418 performs a complementary function as their counterpart blocks 2–6 of FIG. 1. The fundamental channel data is then passed to other subsystems (not shown) in the base station 400 for further processing as required.

When control processor 412 receives a request message from wireless communication device 50 to operate in discontinuous mode, it configures deinterleavers 406, 414, decoders 408, 416, and CRC checkers 410, 418 for operation in discontinuous mode. In one embodiment, this means that deinterleavers 406, 414, decoders 408, 416, and CRC checkers 410, 418 ignore the portions of the frame that do not contain data.

Figure 5:
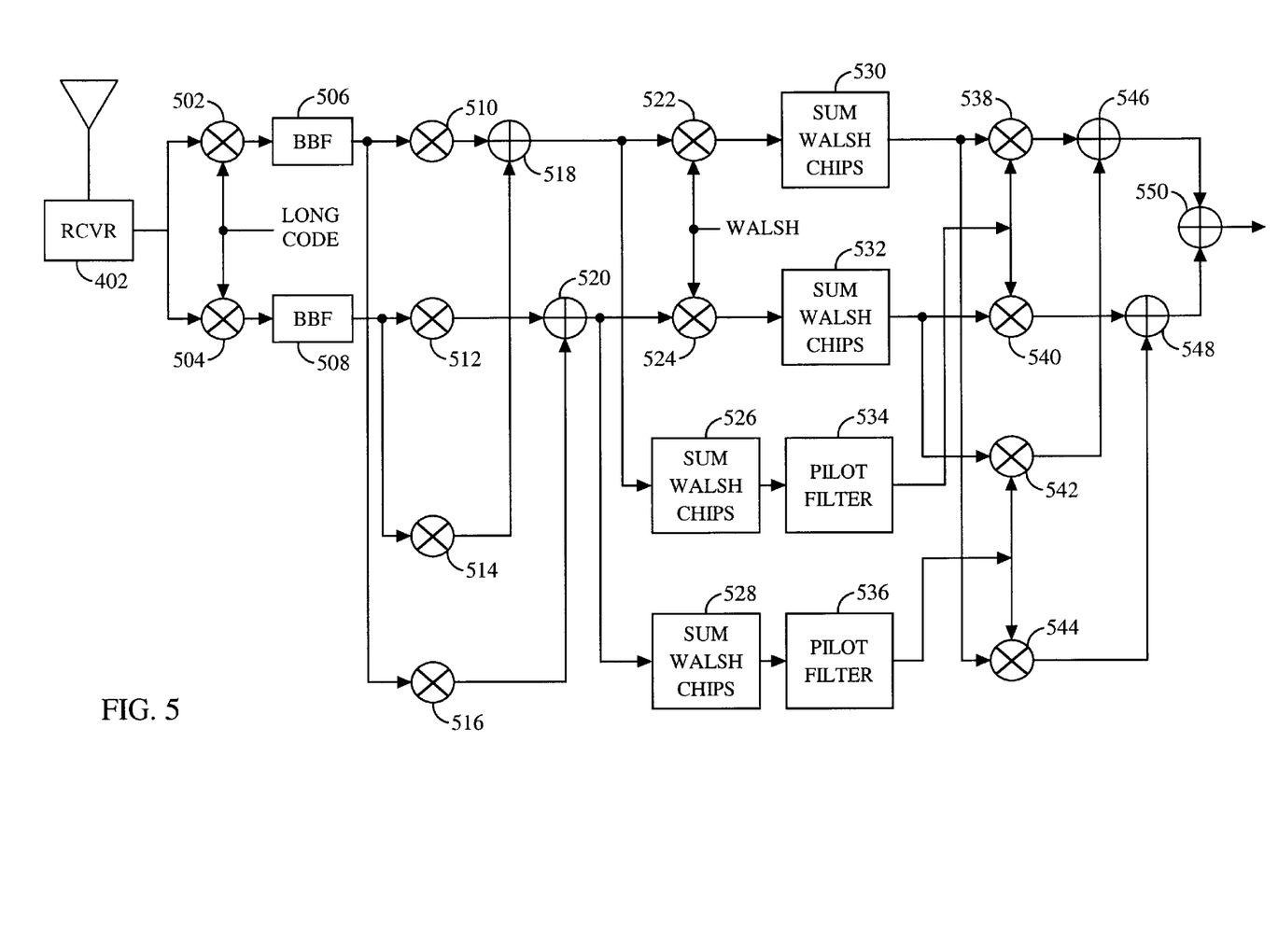
FIG. 5 is an expanded functional block diagram of an exemplary single demodulation chain of demodulator 404 of FIG. 4.

Turning now to FIG. 5, an expanded functional block diagram of an exemplary single demodulation chain of demodulator 404 is shown. In the preferred embodiment, demodulator 404 has one demodulation chain for each information channel. The exemplary demodulator 404 of FIG. 5 performs complex demodulation on signals modulated by the exemplary modulator 26 of FIG. 1. As previously described, receiver (RCVR) 402 downconverts the received reverse link RF signals to a baseband frequency, producing I and Q baseband signals. Despreaders 502 and 504 respectively despread the I and Q baseband signals using the long code from FIG. 1. Baseband filters (BBF) 506 and 508 respectively filter the I and Q baseband signals.

Despreaders 510 and 512 respectively despread the I and Q signals using the $PN_I$ sequence of FIG. 2. Similarly, despreaders 514 and 516 respectively despread the Q and I signals using the $PN_Q$ sequence of FIG. 2. The outputs of despreaders 510 and 512 are combined in combiner 518. The output of despreader 516 is subtracted from the output of despreader 512 in combiner 520.

The respective outputs of combiners 518 and 520 are then Walsh-uncovered in Walsh-uncoverers 522 and 524 with the Walsh code that was used to cover the particular channel of interest in FIG. 2. The respective outputs of the Walsh-uncoverers 522 and 524 are then summed over one Walsh symbol by accumulators 530 and 532.

The respective outputs of combiners 518 and 520 are also summed over one Walsh symbol by accumulators 526 and 528. The respective outputs of accumulators 526 and 528 are then applied to pilot filters 534 and 536. Pilot filters 534 and 536 generate an estimation of the channel conditions by determining the estimated gain and phase of the pilot signal data 40 (see FIG. 1). The output of pilot filter 534 is then complex multiplied by the respective outputs of accumulators 530 and 532 in complex multipliers 538 and 540. Similarly, the output of pilot filter 536 is complex multiplied by the respective outputs of accumulators 530 and 532 in complex multipliers 542 and 544. The output of complex multiplier 542 is then summed with the output of complex multiplier 538 in combiner 546. The output of complex multiplier 544 is subtracted from the output of complex multiplier 540 in combiner 548. Finally, the outputs of combiners 546 and 548 are combined in combiner 550 to produce the demodulated signal of interest 405.

Of particular interest to the present invention are pilot filters 534 and 536. In order to obtain a more accurate estimate of the pilot phase and gain during reception of discontinuous transmissions, the present invention preferably uses a pilot filter that accounts for the 180-degree phase shift at the boundary between continuous and discontinuous transmission in any frame. For example, in the 50% duty cycle transmission 308 (FIG. 3), the pilot filter account for the phase change that occurs at time T/2 in each frame of length T.

One embodiment of the present invention utilizes a "sliding" filter window in combination with a "blocked" filter window in order to avoid improper pilot estimation at the discontinuity boundary. The "blocked" filter is used to estimate the pilot gain and phase immediately before and after any discontinuities in the frame. The "sliding" filter is used to estimate the pilot gain and phase during the remainder of the frame. An exemplary pilot filter that uses a sliding window estimator 600 in combination with a block window estimator 612 is shown in FIG. 6.

Figure 6:
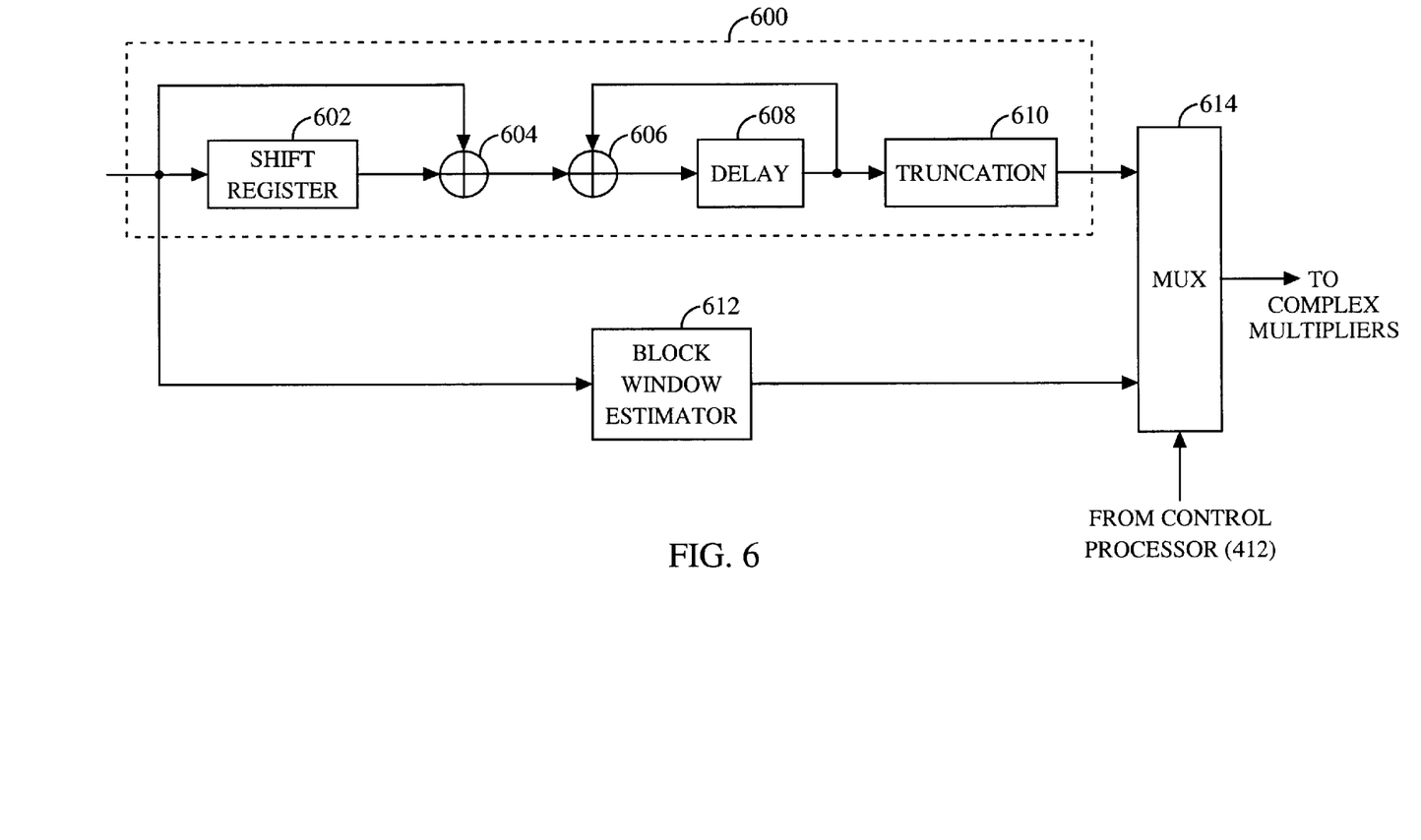
FIG. 6 is an expanded functional block diagram of an exemplary pilot filter that uses a sliding window estimator in combination with a block window estimator.

In FIG. 6, the output of either accumulator 526 of 528 is applied to shift register 602, and is also fed forward to combiner 604. In the exemplary embodiment, shift register 602 is a twelve-stage shift register. The shifted output of shift register 602 is subtracted from the fed-forward input in combiner 604 and provided to combiner 606. The output of combiner 606 is delayed in delay element 608 and fed back to be combined with the output of combiner 604 in combiner 606. The output of delay element 608 is also provided to truncator 610 where it is truncated to be 11 bits, and provided as one selectable input to multiplexer 614. This input to multiplexer 614 represents the sliding window estimate of the pilot phase and gain.

The output of either accumulator 526 or 528 is also provided to block window estimator 612 which simply accumulates the signal over a predetermined period and provides an output representing the block window estimate of the pilot phase and gain as a second selectable input to multiplexer 614.

Multiplexer 614 is controlled by a select signal from control processor 412 which selects between the sliding window estimate and the block window estimate inputs when operating in the discontinuous transmit mode. During a predetermined period immediately before and after any discontinuity, control processor 412 selects the block window estimate from multiplexer 614. At other times during the frame, control processor 412 selects the sliding window estimate from multiplexer 614. The output of multiplexer 614 is then applied to either complex multipliers 538 and 540 or 542 and 544 as shown in FIG. 5.

A slightly different embodiment of the pilot filters 534, 536 implements a sliding window equal taps FIR filter of 2.5 ms in length. However, due to the phase discontinuity boundaries caused by discontinuous transmission, the window size is reduced immediately before and after each phase discontinuity boundary to smooth the effect of the phase discontinuity. The filter is updated at the modulation symbol rate which in the exemplary embodiment is one update every two chips. This results in the corresponding phase estimate output also having a two chip resolution. The minimum window size is preferably 1.25 ms, and the window size grows symbol by symbol until it reaches the sliding window buffer size of 2.5 ms. Other embodiments may use combinations of the techniques described above to account for the phase discontinuity boundaries inherent in discontinuous transmission.

Figure 7:
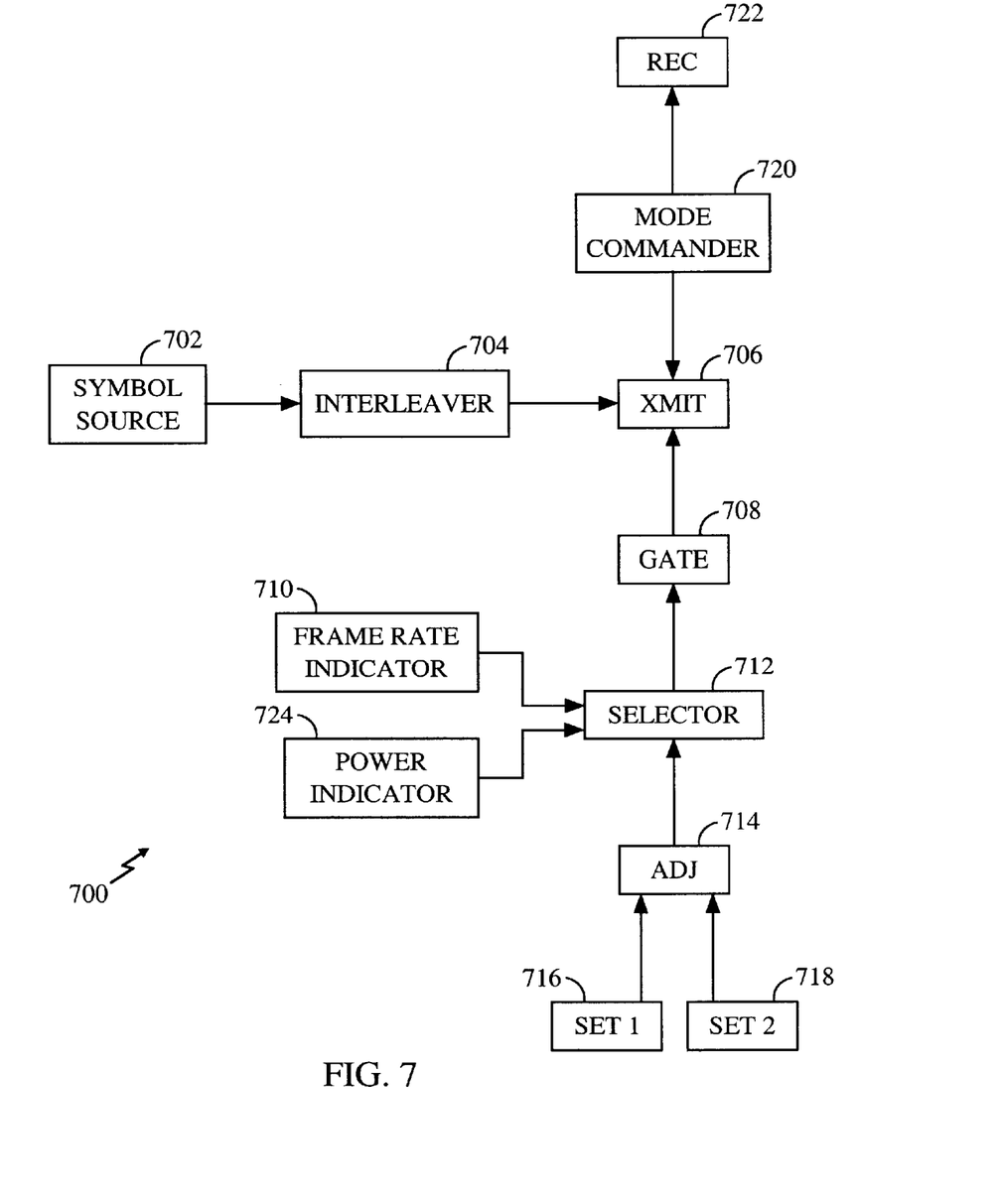
FIG. 7 is a block diagram of apparatus for assisting in hard handoff.

FIG. 7 shows the apparatus of the final aspect of present invention. A Code Division Multiple Access (CDMA) mobile station 700 includes a symbol source 702, an interleaver 704, and a transmitter 706. The symbol source 702 may be a conventional microphone and vocoder.

The interleaver 704 is connected to receive symbols from the symbol source 702, and is constructed to interleave them within a frame. The transmitter 706 is connected to receive the frame of interleaved symbols, and is constructed to transmit it.

The apparatus further includes a gate 708 constructed to disable transmission during a fraction F of the frame. The interleaver 704 is constructed to repeat each symbol at least 1/F times. The gate 708 of FIG. 7 is shown as connected directly to the transmitter 706. It could alternatively fractionally disable transmission by manipulating the interleaver 704. This alternative structure is more complicated and is not preferred.

Preferably, F=½, so the interleaver 704 repeats each symbol at least twice (and preferable more times) in the frame. Thus, even though half of the frame is not transmitted, at least one copy (and preferably more copies) of each symbol is transmitted in each frame.

It is better for the gate 708 to be constructed to disable the transmitter 706 during the first half of the frame rather than the second half. If the transmitted portion of the frame occurs later in the frame, then the mobile station can better estimate the difference between the measured and expected forward signal to noise ratio.

The conventional mobile station 700 includes a frame rate indicator 710, which produces an indication as to how fast the mobile station 700 is transmitting. This indication is useful for many purposes. In the present invention, it is applied to a selector 712. The selector 712 is connected to receive the frame rate indication from the frame rate indicator 710. It is also constructed to selectively enable the gate 708 in response to the frame rate indication. That is, it selectively instructs the gate 708 to turn off the transmitter 706 during the first half of the frame (enables the gate), or instructs the gate 708 to leave the transmitter 706 on for the entire frame (disables the gate).

If desired, the selector 712 may include an adjustment mechanism 714 constructed to enable the gate for all frame rate indications. This is desirable if the mobile station is used in an area where capacity is limited. However, this gating on and off produces interference in the audio band. When it is important to reduce audio interference, the adjustment mechanism 714 may be constructed to disable the gate for all frame rate indications. Preferably, however, the adjustment mechanism 714 is constructed to enable the gate for a first predetermined set of frame rate indications 716, and to disable the gate for a second predetermined set of frame rate indications 718.

The apparatus may also include a mode commander 720, constructed to command a mode in which transmission of frames is enabled only when one of the first (generally slower) predetermined set of frame rate indications is applied to the mode commander 720. That is, the transmitter 706 is disabled—for the entire frame, and not just for its first half—for the second (generally faster) set of frame rates. Thus, the transmitter 706 is disabled for the first half of every frame (and also for the second half of some of the frames). This permits a receiver retuner 722 to be connected to receive a mode command from the mode commander 720. It is constructed to retune a receiver, when so commanded by the mode commander 720, during the fraction of the frame (the first half) during which transmission is disabled.

The conventional mobile station 700 includes a power indicator 724, which indicates the power at which the mobile station 700 is transmitting. The present invention uses this by connecting the selector 712 to receive a power indication from the power indicator 724. The selector 712 is then constructed to selectively enable the gate 708 depending on both the frame rate indication and the power indication.

Figure 8:
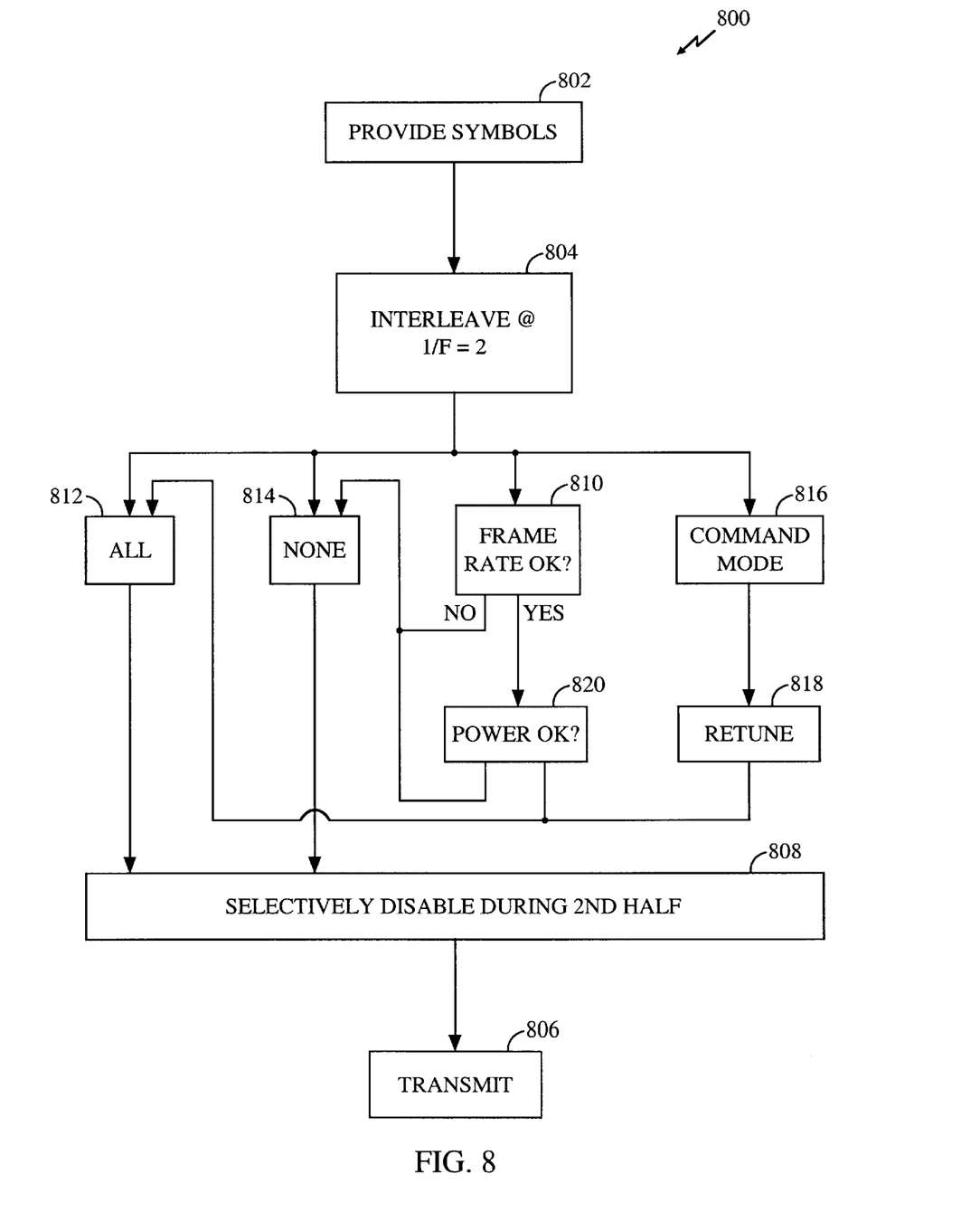
FIG. 8 is a block diagram of a method for assisting in hard handoff.

FIG. 8 shows the method of operation 800 of the final aspect of the present invention. The present invention may thus be viewed as a method 800 for operating a Code Division Multiple Access (CDMA) mobile station. The conventional method includes providing a sequence of symbols 802, interleaving each symbol within a frame 804, and transmitting the frame of interleaved symbols 806. To this, the present invention adds disabling transmission during a fraction F of the frame 808. The interleaving 804 thus must include repeating each symbol at least 1/F times. As before, preferably F=½, and preferably the fractional disabling of the frame transmission takes place during the first half of the frame.

The fractional disabling of the frame transmission is selective in response to a frame rate indication 810. The selective fractional disabling 808 may include fractionally disabling the frame transmission at all frame rate indications 812, or may fractionally disable the frame transmission at no frame rate indication 814.

The selective fractional disabling 808 may include fractionally disabling the frame transmission for a first predetermined set of frame rate indications, and excludes fractionally disabling the frame transmission for a second predetermined set of frame rate indications. The method may further include commanding a mode 816 in which transmission of frames is enabled only for the first predetermined set of frame rate indications. In this case, it also includes retuning a receiver 818, when the mode is so commanded, during the fraction of the frame during which transmission is disabled.

The selective fractional disabling may also include fractionally disabling the frame transmission depending on both the frame rate indication 810 and a power indication 820.

Thus, the present invention provides a method and apparatus for transmit gating in a wireless communication system which allows the wireless communication device to operate either in continuous or discontinuous transmit modes.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

I claim:

1. In a wireless communication device, a method for transmitting frames of information, the method comprising the steps of:

transmitting said information continuously throughout said frame when in a continuous transmit mode and said frame is of a first data rate of a plurality of data rates; and transmitting said information discontinuously in said frame when in a discontinuous transmit mode and said frame is of said first data rate.

2. The method of claim 1 further comprising the step of transmitting said information continuously throughout said frame when said frame is of a second data rate of said plurality of data rates.

3. In a wireless communication system, a method for communicating a frame of information between a wireless communication device and a wireless base station in a continuous transmit mode and a discontinuous transmit mode, said method comprising the steps of:

transmitting, from said wireless communication device, said information continuously throughout said frame when in said continuous transmit mode;

transmitting, from said wireless communication device, a first message notifying said wireless base station of an intention to transmit in a discontinuous mode;

transmitting, from said wireless base station, a second message acknowledging said intention to transmit in said discontinuous mode; and transmitting, from said wireless communication device and in response to said second message, information discontinuously in said frame when in said discontinuous transmit mode.

4. A wireless communication system for communicating a frame of information in a continuous transmit mode and a discontinuous transmit mode, said wireless communication system comprising:

a wireless communication device for transmitting said information continuously throughout said frame when in said continuous transmit mode, and for transmitting a first message notifying a wireless base station of an intention to transmit in a discontinuous mode;

said wireless base station transmitting a second message acknowledging said intention to transmit in said discontinuous mode; and said wireless communication device transmitting information discontinuously in said frame when in said discontinuous transmit mode and in response to said second message.

5. A method for transmitting a frame of data from a wireless communication device, comprising:

selecting a transmit mode based on a data rate of a frame of data when both continuous and discontinuous transmission modes are supported; and transmitting the frame of data in said selected transmit mode.

6. The method of claim 5 wherein the transmitting comprises transmitting the frame of data at approximately a 50% duty cycle.

7. The method of claim 5 wherein the transmitting comprises gating a beginning part of the frame of data.

8. The method of claim 5 wherein the transmitting comprises transmitting an ending part of the frame of data.

9. The method of claim 5 wherein the transmitting comprises gating a beginning part of the frame of data and transmitting an ending part of the frame of data.

10. The method of claim 5 wherein the transmitting comprises transmitting a part of the frame of data at approximately one-quarter of a predetermined maximum level.

11. The method as claimed in claim 5, wherein said selecting comprising:

selecting the discontinuous transmission mode when the data rate is less than a predetermined data rate from a plurality of data rates.

12. The method of claim 11, further comprising transmitting a reverse link pilot in the continuous transmit mode.

13. The method of claim 11 wherein said selecting comprises selecting the discontinuous transmit mode when the data rate is an eighth rate and selecting the continuous transmit mode when the data rate is a rate other than the eighth rate.

14. The method of claim 11, further comprising transmitting a reverse link pilot in the discontinuous transmit mode.

15. The method of claim 14 wherein the transmitting comprises reducing a power amplifier bias current.

16. The method of claim 14 wherein the transmitting comprises reducing a power amplifier driver current.

17. The method as claimed in claim 5, further comprising:

determining supported transmission modes.

18. The method as claimed in claim 17, wherein said determining supported transmission modes comprise:

transmitting, from the wireless communication device, a first message containing transmission mode capability of said wireless communication device;

receiving, at the wireless communication device, a second message, acknowledging the first message; and determining supported transmission mode in accordance with the second message.

19. The method as claimed in claim 18, wherein the transmitting, from the wireless communication device, a first message containing transmission mode capability of said wireless communication device comprises:

transmitting, from the wireless communication device, a first message containing an intention to transmit in a discontinuous mode.

20. The method as claimed in claim 18, wherein the transmitting, from a wireless communication device, a first message containing transmission mode capability of said wireless communication device comprises:

transmitting, from a wireless communication device, a first message containing a request to transmit in a discontinuous mode.

21. An apparatus for transmitting a frame of data from a wireless communication device, comprising:

a modulator configured to modulate a pilot signal and a frame of data to provide a reverse link signal;

a control processor configured to select a transmit mode based on a data rate of the frame of data when both continuous and discontinuous transmission modes are supported; and a transmitter configured to transmit the frame of data in the selected transmit mode.

22. The apparatus of claim 21 wherein the transmitter is configured to transmit the reverse link signal at approximately a 50% duty cycle.

23. The apparatus of claim 21 wherein the transmitter is configured to gate a beginning part of the reverse link signal.

24. The apparatus of claim 21 wherein the transmitter is configured to gate a beginning part of the reverse link signal and to transmit an ending part of the reverse link signal.

25. The apparatus of claim 21 wherein the transmitter is configured to transmit a part of the reverse link signal at approximately one-quarter of a predetermined maximum level.

26. The apparatus as claimed in claim 21, wherein said control processor is configured to select the discontinuous transmission mode when the data rate is less than or equal to a predetermined data rate from a plurality of data rates.

27. The apparatus of claim 26 wherein said control processor is configured to select the discontinuous transmit mode when the data rate is an eighth rate and select the continuous transmit mode when the data rate is a rate other than the eight rate.

28. The apparatus of claim 26 wherein said transmitter is configured to transmit reverse pilot in the discontinuous transmit mode.

29. The apparatus of claim 26, wherein said transmitter is further configured to transmit a reverse link pilot in the continuous transmit mode.

30. The apparatus of claim 28 wherein said control processor is configured to reduce a power amplifier bias current to said transmitter based on the selecting.

31. The apparatus of claim 28 wherein said control processor is configured to reduce a power amplifier driver current to said transmitter based on the selecting.

32. The method as claimed in claim 5, further comprising:
   searching, by the wireless communication device, for an alternative wireless communication system in the discontinuous transmission mode.

33. The method as claimed in claim 32, wherein said searching, by the wireless communication device for an alternative wireless communication system in the discontinuous transmission mode comprises:
   tuning receiver to a frequency used by the alternative communication system during periods of non-transmission.

34. The apparatus as claimed in claim 21, wherein said control processor is further configured to determine supported transmission modes.

35. The apparatus as claimed in claim 34, further comprising:
   a receiver, and
   and wherein said control processor determines supported transmission mode by being configured to:
      cause the transmitter to transmit a first message containing transmission mode capability of said wireless communication device;
      obtain a second message, received by the receiver, the second message acknowledging the first message; and
      determine supported transmission mode in accordance with the second message.

36. The apparatus as claimed in claim 35, wherein the first message contains an intention to transmit in a discontinuous made.

37. The apparatus as claimed in claim 35, wherein the first message contains a request to transmit in a discontinuous mode.

38. The apparatus as claimed in claim 21, wherein said control processor is further configured to search for an alternative wireless communication system in the discontinuous mode.

39. The apparatus as claimed in claim 38, wherein said control processor is configured to search by causing the receiver to tune to frequencies used by the alternative communication system during periods of non-transmission.

* * * * *